(12) United States Patent
Sirovich

(10) Patent No.: US 8,262,314 B2
(45) Date of Patent: Sep. 11, 2012

(54) METHOD FOR DECREASING THE INTENSITY AND FREQUENCY OF TROPICAL STORMS OR HURRICANES

(76) Inventor: Lawrence Sirovich, New York, NY (US)

( * ) Notice: Subject to any disclaimer, the term of this patent is extended or adjusted under 35 U.S.C. 154(b) by 0 days.

(21) Appl. No.: 11/317,062

(22) Filed: Dec. 22, 2005

(65) Prior Publication Data

US 2007/0158448 A1 Jul. 12, 2007

(51) Int. Cl.
*A01G 15/00* (2006.01)

(52) U.S. Cl. .......................................... 405/52; 239/2.1

(58) Field of Classification Search .................. 239/2.1, 239/14.1
See application file for complete search history.

(56) References Cited

U.S. PATENT DOCUMENTS

| | | | | |
|---|---|---|---|---|
| 3,896,622 | A | * | 7/1975 | Daniello ...................... 60/641.7 |
| 4,044,720 | A | * | 8/1977 | Fast .............................. 119/223 |
| 4,470,544 | A | | 9/1984 | Bronicki et al. .............. 239/2.1 |
| 4,656,959 | A | * | 4/1987 | Moisdon ...................... 114/56.1 |
| 4,724,086 | A | * | 2/1988 | Kortmann ..................... 210/747 |
| 5,092,268 | A | * | 3/1992 | Taylor .......................... 119/223 |
| 5,492,274 | A | | 2/1996 | Assaf et al. ................... 239/2.1 |
| 5,995,882 | A | * | 11/1999 | Patterson et al. ............... 701/21 |
| 6,231,268 | B1 | | 5/2001 | Hausenbauer .................. 405/61 |
| 6,428,711 | B1 | * | 8/2002 | Nakamura et al. ............. 210/747 |
| 7,329,351 | B2 | * | 2/2008 | Roberts et al. ................ 210/620 |
| 2002/0009338 | A1 | * | 1/2002 | Blum et al. .................... 405/303 |
| 2004/0011881 | A1 | * | 1/2004 | Morales ......................... 239/2.1 |
| 2005/0031417 | A1 | * | 2/2005 | Hofer et al. ...................... 405/52 |
| 2005/0133612 | A1 | * | 6/2005 | Uram ............................. 239/2.1 |
| 2007/0119495 | A1 | * | 5/2007 | Sumrall ......................... 136/205 |

OTHER PUBLICATIONS

Carmody, Th. (1964) J. Basic Engng. Trans. A.S.M.E., 86D, 689.
Chevray, R. (1968) The turbulent wake of a body of revolution. J. Basic Engineering, vol. 90.
Handbook of Chemistry and Physics (1973).
Jiménez, J.M., Allen, J.J. and Smits, A.J. (2001) Preliminary velocity measurements in the wake of a submarine model. 4th International Symposium of Particle Image Velocimetry, Gottingen, Germany, Sep. 17-19.
Lin, J.-T. & Pao, Y.-H. (1979) Wakes in stratified fluids. Ann. Rev. Fluid Mech., 11:317-338.
Polmar, N. & Moore, K.J. (2003) Cold War Submarines. Potomac Books.
Schlichting, H. (1966) Boundary-Layer Theory. In: Series in Mechanical Engineering 6th Edition, New York:McGraw Hill.
Schooley, A.H., Stewart, R.W. (1963) Experiments with a self-propelled body submerged in a fluid with a vertical density gradient. J. Fluid Mech., 9:83-96.
Serruya, C. (1989) Effects of Artificial Sea Mixing. In: Global Climate Change: Human and Natural Influences, (Ed. S. Fred Singer) Paragon House.
Townsend, A.A. (1956) The Structure of Turbulent Shear Flow, Cambridge:Cambridge Univ. Press.
Tzvetkov, E. & Assaf, G. (1982). The Mediterranean heat storage and Israeli precipitation. Water Resources Research 18: 1036-1040.

\* cited by examiner

*Primary Examiner* — Tara Mayo-Pinnock
(74) *Attorney, Agent, or Firm* — Lackenbach Siegel, LLP; Myron Greenspan

(57) ABSTRACT

Modification of tropical storms or hurricanes by mixing the upper layer of a section of a body of water with water from a lower section of the body of water. Rapidly mixing the warmer upper layer with the cooler lower layer cools the surface of the water, thereby reducing the amount of heat energy available to fuel the intensity and movement of storms. By cooling selected sections of water, the frequency, intensity or direction of storms may be altered. In one embodiment of the invention, a bluff shaped object is attached to a submarine to facilitate rapid mixing of the upper and lower layers of the body of water.

17 Claims, 3 Drawing Sheets

METHOD FOR DECREASING THE INTENSITY AND FREQUENCY OF TROPICAL STORMS OR HURRICANES

FIELD OF THE INVENTION

The present invention relates generally to the field of weather modification. More specifically, the present invention relates to methods for modifying and suppressing the spawning of tropical storms, and modification of the dynamics of hurricanes and diminishing their intensity.

BACKGROUND INFORMATION

The world's oceans and seas typically have temperature versus depth profiles that can be characterized generally as shown in FIG. 1. For example, the upper layer is usually at a uniform temperature as a result of wind and wave mixing. The temperature is determined by the intensity and duration of solar radiation, as well as the efficiency of wind driven surface mixing. Although the depth of the upper layer varies depending on the season, a nominal depth for the upper layer is approximately 50 meters. Deeper water is usually significantly colder, approximately 10° C. colder than the upper layer. The transition between upper and lower layers is referred to as the thermocline. The thermocline has a nominal thickness of approximately 20 meters. Although these dimensions vary depending on the time of year and geographic location, the numbers presented are for illustrative purposes.

It is well-known that hurricanes which travel to North America originate from tropical storms that are spawned in the tropical waters of the eastern Atlantic, near the Western coast of Africa. It also is understood that the originating tropical storms, and the hurricanes which develop from them, are fueled by the energy content of the warm, upper layers of the ocean. There is a strong correlation between the frequency and strength of such storms and the energy content of those upper, heated layers of the ocean.

Accordingly, decreasing the temperature of this upper layer of ocean water could diminish the occurrence and intensity of tropical storms. In addition, decreasing the temperature of the upper, warmer layer of ocean in the path of a hurricane could (1) diminish, or quench, the strength of a hurricane; or (2) alter the course of a hurricane.

U.S. Pat No. 4,470,544 and U.S. Pat. No. 5,492,274 disclose methods for slowly mixing layers of sea water to achieve greater rainfall in the Mediterranean basin. Slowly mixing layers of a large body of water increases the potential solar energy captured by the water, and increases the intensity of storms fueled by the energy content of the water. To diminish the strength of a hurricane or alter its course, however, rapid mixing of ocean layers is required.

SUMMARY OF THE INVENTION

The present invention provides an exemplary method for affecting the strength and/or direction of a storm, such as a hurricane, by cooling the upper, warmer layer of a large body of water and mixing it with the significantly cooler water that exists below the relatively warmer upper layer. The displacement and resulting mixing is achieved, for example, by submarines or other suitable vessels operating in the thermocline, the transition layer between the upper warm layer and the deeper cold layer of ocean.

In one exemplary embodiment of the present invention, relatively large areas of East Atlantic tropical waters are cooled to reduce the intensity and/or frequency of tropical storms.

In a second exemplary embodiment of the present invention, sections of upper ocean layers in the vicinity of a hurricane, or in the vicinity of the expected path of a hurricane, are rapidly cooled to alter the course of a hurricane, slow the speed of a hurricane, or reduce the intensity of a hurricane.

DETAILED DESCRIPTION

Figure 1:
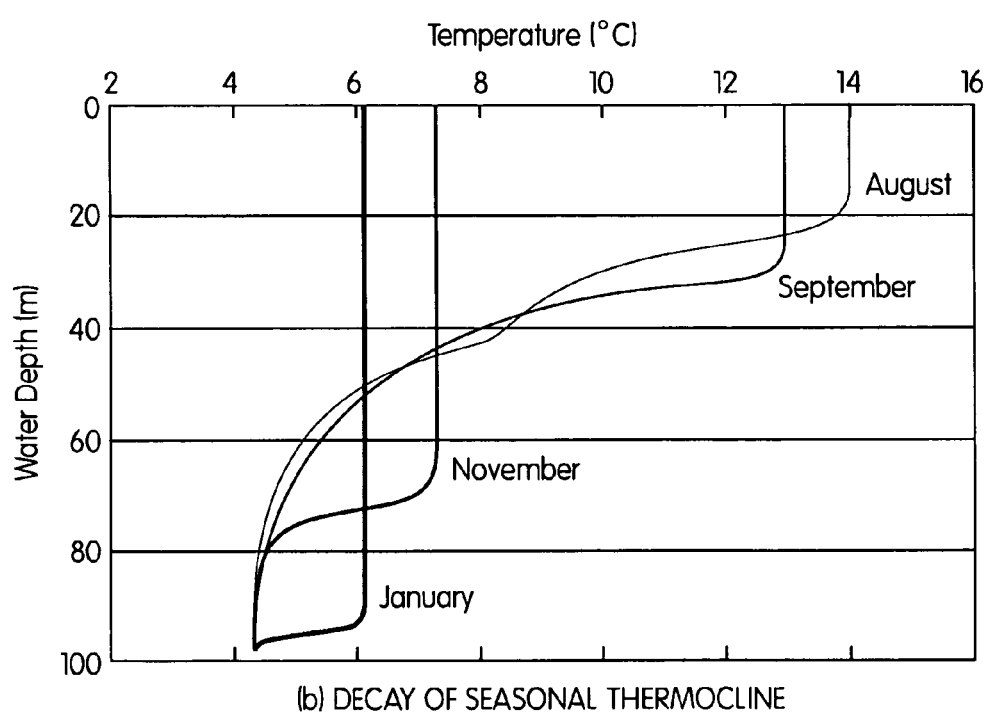
FIG. 1 is a diagram depicting the water depth of the thermocline for various months of the year.
Figure 2:
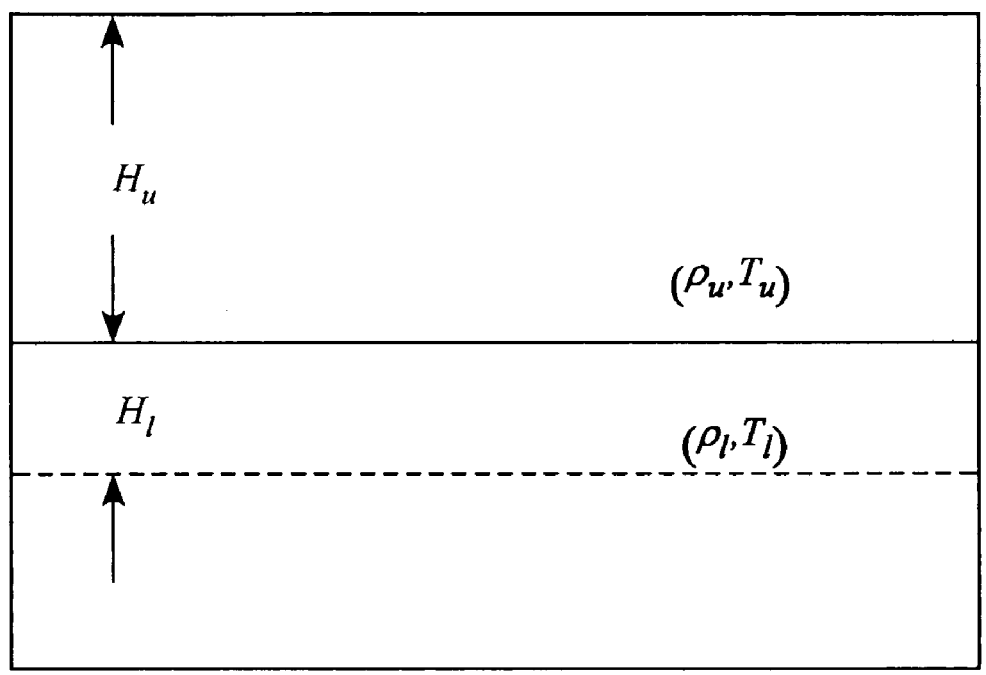
FIG. 2 is a diagram depicting the warmer, upper layer of a large body of water and the cooler, lower layer of the large body of water.

A simple calculation suffices for determining the work required to cool the upper layer of a section of a large body of water by mixing it with water from a lower layer. For illustrative purposes, the large body of water is assumed to be the Atlantic Ocean. FIG. 2 depicts the approximate heights, densities and temperatures of two layers of the ocean as ($H_u, \rho_u, T_u$) and ($H_l, \rho_l, T_l$) respectively for the upper and lower layers. If a 1 m² column height $H_l$ is raised to the average height of $H_u/2$ the work, W, required to displace such a column of ocean water can be estimated by the equation $$W = \frac{g}{2}(\rho_l - \rho_u)H_l H_u$$

where g represents acceleration due to gravity (approximately 10 m/s²). The resulting 1 m² column of height $H_l + H_u$ will be at the approximate temperature $$\bar{T} = \frac{H_u T_u + H_l T_l}{H_u + H_l}$$

The heavy, colder, lower layer of the ocean is approximately 0.2% heavier than the warm, upper layer of the ocean as explained in the Handbook of Chemistry and Physics, 1973 at D221, which is hereby incorporated by reference. As is known in the art, the nominal density of seawater in the upper layer is approximately 1025 kg/m³ and the nominal density of seawater in the colder, lower layer is approximately 1027 kg/m³. Therefore, for $H_u$=50 m, $H_l$=20 m (g=10 m/s², $\rho_l - \rho_u$=2 kg/m³), the work required to displace the colder water into the upper warmer water is approximately W=10⁴ joules. Under summer conditions, the water temperature of the new upper layer will be about 5° C. colder as a result of mixing the lower layer of colder water into the upper layer. For a nominal surface area of ocean of 10¹⁰ m² (roughly 3600 sq. miles), the work needed to mix the upper and lower layers in this fashion would be approximately $\bar{W}$=10¹⁴ joules.

Mixing Layers of Large Bodies of Water

Submarines offer a highly efficient means of ocean travel. Unlike surface ships, submarines create virtually no wave drag. Although performance information on nuclear submarines remains largely confidential, typical cruise speeds are reasonably assumed to be in excess of 30 knots, or approximately 15 m/sec. Nuclear submarines are highly streamlined, but only limited data is available in the literature concerning their performance and drag characteristics. See Polmar & Moore, Cold War Submarines (2003). However, a consensus value for the coefficient of drag of a nuclear submarine is $c_f^0 \approx 0.4$ as understood by those skilled in the art.

Nuclear submarines can remain submerged for very long periods of time. Also, underwater travel is relatively unaffected by surface conditions. Hurricanes do not significantly affect submarine dynamics at a depth of approximately 50 m.

On this basis, the power output of a submarine with an effective cross-sectional area A cruising at speed $U_0$ is $$P = \frac{1}{2}\rho U_0^3 c_f^0 A,$$

where $c_f^0$ is the drag coefficient. For $U_0$=30 knots (15 m/sec) and A=100 m²

$$P \approx 5 \times 10^7 \text{ joules/sec}(50 \text{ MW})$$

Figure 3:
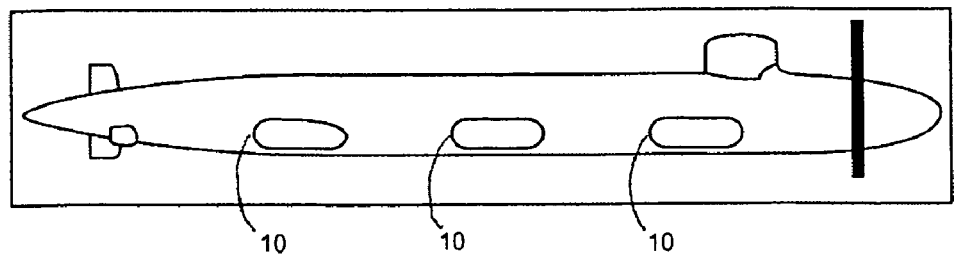
FIG. 3 is a diagram of a submarine with a bluff-shaped obstacle mounted at the bow of the submarine according to an exemplary embodiment of the present invention.
Figure 4:
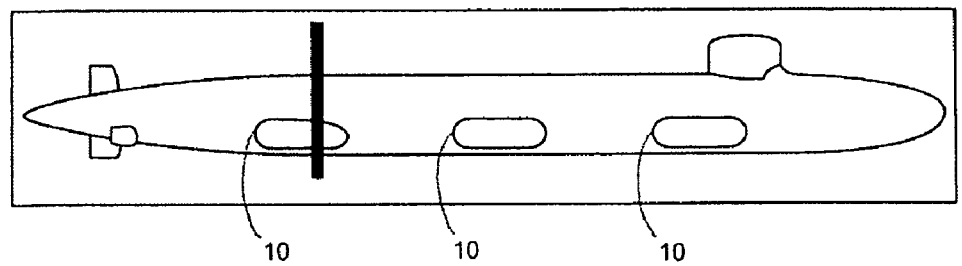
FIG. 4 is a diagram of a submarine with a bluff-shaped obstacle mounted on the submarine at a location that is downstream from the bow of the submarine according to an exemplary embodiment of the present invention.

The streamlined features of a submarine makes it less than optimal for rapidly mixing layers of the ocean. In order to achieve rapid mixing of ocean layers, turbulent flow with eddy generation in the 5-10 m diameter range is desirable. As shown in FIGS. 3 and 4, such eddy generation can be achieved, for example, by (1) mounting on the bow of the submarine a bluff-shaped obstacle capable of generating the necessary eddy turbulence, such as a 10 m×10 m flat plate (normal to the direction of travel); or (2) mounting at some other location downstream of the bow of the submarine a bluff-shaped obstacle capable of generating the necessary eddy turbulence.

Turbulence devices such as bluff shaped objects may be mounted on the submarine so that they lie flat along the outer surface of the submarine, or so that they are located within the hull of the submarine, when turbulence generation is not desired (e.g. when the submarine is traveling to the section of the large body of water to be cooled). When turbulent flow is desired, the bluff shaped objects could fold away from the surface of the submarine or extend outward from the surface of the submarine to generate the necessary eddy turbulence.

Figure 5:
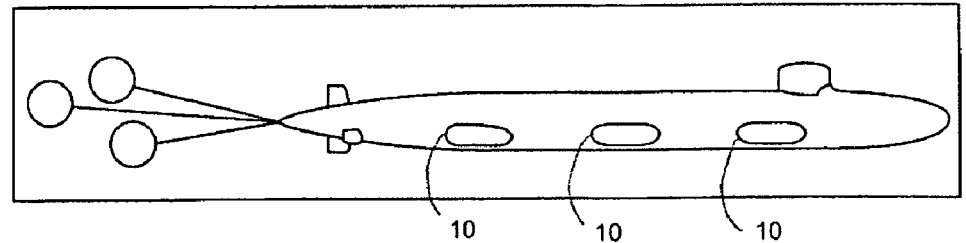
FIG. 5 is a diagram of a submarine with bluff-shaped obstacles towed behind the submarine according to an exemplary embodiment of the present invention.

As shown in FIG. 5, eddy generation also can be achieved, for example, by towing behind the submarine one or more bluff-shaped obstacles capable of generating the necessary eddy turbulence. Towing the bluff-shaped obstacles would also add more fluctuations. The towed obstacles may be attached to the submarines by cables, ropes, rods, chains, or similar means.

As also shown in FIGS. 3, 4 and 5, one or more fins (10) may be mounted to at least one side of the submarine. Submarines typically employ multiple fins to help steer the submarines through the water. As appreciated by someone of ordinary skill in the art, the fins attached to a submarine typically have a shape similar to that of an airplane wing. Based on the principles of aerodynamics, when air flows over the surfaces of an airplane wing, the wing produces lift by generating a low pressure region near the upper surface of the wing, and a high pressure region near the underside of the wing. The resulting pressure difference between these two regions results in an upward force on the wing which allows the airplane to fly. In addition, the wing also asserts an equal and opposite force on the surrounding air, forcing the air downward.

Similarly, as appreciated by someone of ordinary skill in the art, submarine fins are used to raise or lower submarines by generating varying pressure regions on the surfaces of the fins when the fins pass through water. Those same pressure regions also cause the surrounding water to be directed perpendicularly to the surface of the fins. As shown in FIGS. 3, 4 and 5, the fins (10) could be generally situated so that they lie parallel to the plane of travel of the submarine. The fins (10) could also provide a vertical force on the water which could further enhance the mixing of the water. As appreciated by one of ordinary skill in the art, a plurality of fins could be arranged to provide alternating upward and downward force on the water.

A nominal drag coefficient for a flat plate moving normal to itself is 1.6. If we denote the coefficient of drag of the above modified submarine by $c_f^b$, and assume that the cross-sectional area of the modified submarine is equal to the original cross-sectional area of the submarine, it follows that under constant power, the speed of the modified submarine, $U^b$, is reduced by a factor of $$\left(\frac{U^b}{U_0}\right) = \left(\frac{c_f^0}{c_f^b}\right)^{1/3} (\approx 0.63)$$

Given a speed of $U_0$=30 knots (kts) for an unmodified submarine, a modified submarine would travel at an approximate speed of $U^b \approx 18$ kts, a speed which easily outruns typical hurricanes.

Diminishing the Intensity and Frequency of Tropical Storms

On the basis of the above estimates, a 100 km×100 km section of ocean surface can be cooled 5° C. by one submarine in approximately 24 days. For example, $$\frac{W}{P} = \frac{10^{14}}{5 \times 10^7} \sec \approx 24 \text{ days}$$

A more substantial section of ocean surface, say 300 km×300 km (15,000 sq. miles), could be cooled by, for example, nine submarines in the same 24 day period. To minimize the number and strength of hurricanes in a given year, a desired number of submarines could cool the section of ocean a few weeks before the hurricane season.

Particular deployment of submarines can be optimized according to simulation models. Several factors support the proposition that the above mixing times can be achieved by, for example, nine submarines traveling at the depth of the thermocline. For example, the Reynolds number for typical submarine movement is $O(10^8)$, and the diameter of the turbulent wake is known to expand proportionally to $x^{1/3}$ to $x^{1/2}$ where x marks the distance traveled, as explained in Carmody, J. Basic Engng. Trans. A.S.M.E. (1964), Chevray, The turbulent wake of a body of revolution, J. Basic Engineering, Vol. 90 (1968), and Jiménez, et al., Preliminary velocity measurements in the wake of a submarine model, 4th International Symposium of Particle Image Velocimetry, Sep. 17-19, 2001, which are hereby incorporated by reference. After a suitable initial time, measured in minutes, to allow the submarines to develop sufficient eddy generation, 9 submarines traveling in parallel, roughly 500 meters apart from each other, could well mix 2,500 km² in roughly 18 hours.

Two additional effects enhance the turbulence intensity and aid in retarding natural turbulence decay. First, vertical stratification enhances the horizontal spread of eddies. This effect, sometimes referred to as "wake collapse," facilitates the lateral spread of turbulence. Second, the ocean surface itself acts as a reflecting surface for turbulent eddy spread, hence also enhancing horizontal spread of the turbulent eddies.

Alteration of Hurricane Paths and Intensity.

Current modeling and simulation provide reasonable forecasts for hurricane paths for up to 5 days. The core region of a hurricane, which accounts for energy uptake of the upper warmer layer of ocean, generally spans an area approximately 50 km×50 km. Such a region can be cooled 5° C. by 9 submarines in approximately 18 hours.

The above determined 18 kts modified submarine speed permits the submarines to outrun the hurricane. An interactive strategy of ocean cooling and renewed path forecasting provides a dynamic program for quenching and/or redirecting hurricanes. Under natural conditions, the path of a hurricane is determined by available warm surface waters to fuel its movement and intensity. Therefore, selective cooling of the upper layer of ocean water can be used to redirect the path to areas less vulnerable than populated cities, such as the open ocean.

The possibility also exists for cooling the upper layers of the ocean surrounding the core region of a hurricane, thereby stalling the hurricane at sea. By continuing to encircle the hurricane, the intensity of the hurricane may be reduced and the hurricane may be completely quenched.

Although certain preferred exemplary embodiments of the present invention have been shown and described in detail, it should be understood that various changes and modifications may be made therein without departing from the scope of the appended claims.

What is claimed is:

1. A method for decreasing one of intensity and frequency of a storm passing over a body of water forming an upper warmer layer of water and a cooler lower layer of water, said method comprising the steps:
    a) attaching a turbulence generating device having a bluff-shaped surface to at least one sea vessel disposed in the body of water;
    b) transporting the bluff-shaped device through the body of water at a selected speed sufficient to generate eddy turbulence; and
    c) mixing the warmer, upper layer of water of at least one section of the body of water with water from the cooler, lower layer of the body of water as a result of movement of the bluff-shaped device through a thermocline layer of the body of water and the generation of said eddy turbulence, said selected speed being greater that the speed of movement of a forming hurricane, the mixing being achieved by upwardly displacing cooler water into the upper warmer layer of water and mixing the cooler and warmer layers by means of said eddy turbulence to lower the temperature of the upper layer in said at least one section over an area corresponding to a core region of a hurricane.

2. A method as recited in claim 1, wherein the work to upwardly displace and mix the upper and lower layers over a section having an area of approximately 3600 sq, miles is approximately $10^{14}$ Joules.

3. A method as recited in claim 1, wherein said bluff-shaped device is attached to the bow of the submarine.

4. A method as recited in claim 1, wherein said bluff-shaped device includes a substantially vertically oriented flat plate when said at least one sea vessel is moved in a substantially horizontal direction to displace water and effect mixing.

5. A method as recited in claim 4, wherein said plate measures 10 meters wide by 10 meters high.

6. A method as recited in claim 1, wherein the bluff-shaped device is towed behind a submarine.

7. A method as recited in claim 1, wherein movement of the turbulence device generates turbulent flow with eddies that are within the range of 5 to 10 meters in diameter.

8. A method as recited in claim 1, wherein said temperature of an upper layer of said core region is reduced by at least 5° C.

9. A method as recited in claim 8, wherein said temperature is reduced by 5° C.

10. A method for cooling a section of a body of water forming an upper warmer layer of water and a cooler lower layer of water, comprising the steps of:
    a) locating a plurality of submarines at predetermined positions in a section of the body of water;
    b) affixing a turbulence generating device having a bluff-shaped surface to each of the submarines; and
    c) directing the plurality of submarines to follow a predetermined path through the section of the body of water at a selected speed to generate eddy turbulence; and
    d) mixing the warmer upper layer of the section of the body of water with water from the cooler lower layer of water of the section of the body of water as a result of movement of the bluff-shaped devices through a thermocline layer of the section of the body of water and the generation of said eddy turbulence, said selected speed being greater that the speed of movement of a forming hurricane, the mixing being achieved by upwardly displacing cooler water into the upper warmer layer of water and mixing the cooler and warmer layers by means of said eddy turbulence to lower the temperature of the upper layer in the section over an area substantially corresponding to a core region of a hurricane.

11. The method of claim 10, wherein the plurality of submarines includes nine submarines spaced 500 meters apart.

12. The method of claim 10, wherein the section of the large body of water is 50 km by 50 km.

13. A method as recited in claim 10, wherein the submarines use at least one fin to enhance the mixture of the warmer, upper layer of water with water from the cooler, lower layer of water.

14. A method as recited in claim 10, wherein movement of the turbulence device generates turbulent flow with eddies that are within the range of 5 to 10 meters in diameter.

15. A method as recited in claim 10, wherein the sea vessel is operated in the thermocline layer.

16. A method as recited in claim 10, wherein said temperature of an upper layer of said core region is reduced by at least 5° C.

17. A method as recited in claim 16, wherein said temperature is reduced by 5° C.

* * * * *